No. 684,481. Patented Oct. 15, 1901.
C. P. WALTER.
CASTER.
(Application filed Aug. 29, 1900.)
(No Model.)

Witnesses
E. W. Hart
Chas. W. Parker

Inventor
Christian P. Walter.
By Milo B. Stevens & Co.
Attorneys

THE NORRIS PETERS CO., PHOTO-LITHO., WASHINGTON, D. C.

UNITED STATES PATENT OFFICE.

CHRISTIAN P. WALTER, OF CHICAGO, ILLINOIS.

CASTER.

SPECIFICATION forming part of Letters Patent No. 684,481, dated October 15, 1901.

Application filed August 29, 1900. Serial No. 28,380. (No model.)

*To all whom it may concern:*

Be it known that I, CHRISTIAN P. WALTER, a citizen of the United States, residing at 457 South Winchester avenue, Chicago, in the county of Cook and State of Illinois, have invented an Improvement in Casters, of which the following is a specification.

This invention relates to improvements in casters, and is embodied in the novel parts, arrangement, and combination of parts hereinafter described, and particularly set forth in the claims.

The invention is especially adapted for use in connection with metal beds or furniture.

In the existing state of the art it is not new to drive a wooden plug into a bore in the leg of the bed or other piece of furniture and insert a metal socket which is driven into the wooden plug. With such a construction a slight variance in the size of the tubing of the leg will cause the plug to split the tubing or be fractured itself if too large, or the plug will drop out if too small.

It is the object of the present invention to provide a novel construction of socket and caster coöperating therewith, such that the socket, although not necessarily fitting the bore in the leg therefor, can be inserted and retained therein without danger of splitting the tubing.

It is a further object of the invention to provide a novel construction of caster-socket provided with a resilient or elastic portion which will permit of the socket entering bores of varying diameter and will effectually retain the socket in the tubing and the caster in the socket.

A further object of the invention is to provide a novel construction of caster-socket and caster-shank whereby the shank has a reduced bearing in the socket and is at the same time held therein and prevented from being accidentally displaced or dropped from the socket.

The invention has for a further object to produce a caster-socket of a simple and cheap construction which will be practical and effective for the purpose for which it is intended.

In the accompanying drawings I have illustrated a practical embodiment of the invention, but desire it particularly understood that the invention is not limited in its useful applications to the particular construction, which for the sake of illustration I have there delineated.

Figure 1:
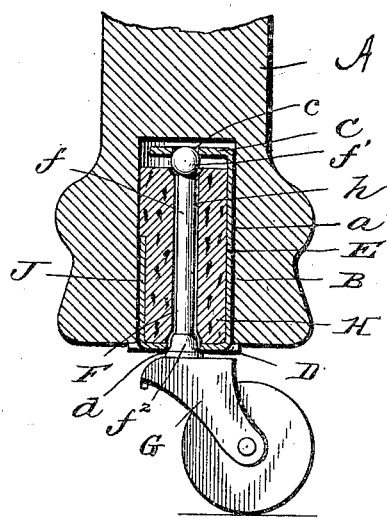
Figure 2:
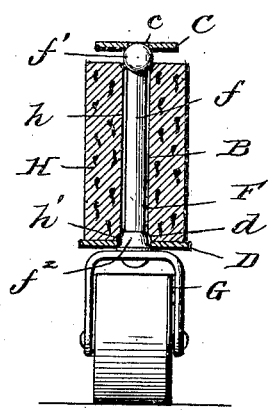
Figure 3:
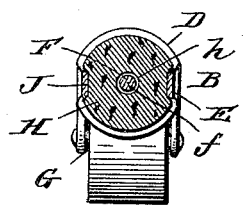
Figure 4:
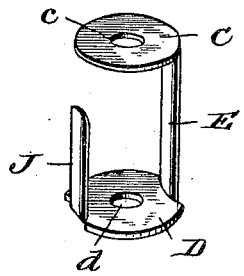

In the drawings, Figure 1 is a vertical sectional view through a portion of the leg of a bed or the like, showing a caster and socket embodying my invention. Fig. 2 is a transverse vertical sectional view. Fig. 3 is a horizontal sectional view; and Fig. 4 is a perspective view of the socket, the resilient retaining means being removed.

Referring to the drawings, A indicates a leg of a bed or other piece of furniture, the leg being provided in its lower end with a vertical bore or hole *a*. Within the hole *a* is removably placed a caster-socket B, which is formed of two separated bearing-plates C and D, connected and held in the relative position shown by means of a connecting shank or bar, (indicated at E.) The plates C and D are provided, respectively, with bearing-openings *c* and *d* for the shank of the caster, which shank is indicated at F and is secured to and projects from the caster shown at G, which may be of any usual or preferred construction. Held between the two socket-plates C and D is a plug of elastic or resilient material H. This plug is held in position by suitable means—such, for instance, as the bar or shank E and an oppositely-disposed retaining finger or portion J. It will be observed that the upper plate C is of smaller diameter than the lower plate D and the plug H and that the bar or shank F and retaining-finger J are sufficiently close together to tightly grasp and retain the resilient plug and lie within the circumference of the lower plate D, whereby when the socket is inserted in the bore or hole in the leg only the elastic plug will engage the walls of the bore. In this manner it will be evident that should the plug be slightly larger than the bore or hole *a*, which it preferably should be, it can be readily inserted in the bore and firmly retained therein without liability of splitting the tubing of the leg A. The plug H is provided with a central hole *h* in alinement with the holes *c* and *d*, the opposite ends of the hole *h* being somewhat enlarged, as indicated at *h'*.

The shank F of the caster, as will be seen, has a reduced body *f* and an enlarged head *f'* of sufficient size to bear against but not pass through the opening $c$. The shank also has at its lower end an enlarged base portion $f^2$ of a size to engage but not pass through the opening $d$. The head of the shank is sufficiently small to pass through the opening $d$, so that the shank can be inserted in the socket with its head finding bearing in the hole $c$ and its base finding bearing in the hole $d$. The enlargements of the shank lie in the enlarged portions of the hole $h$ through the plug H, so that the latter will not frictionally bear thereon. It will thus be seen that the shank has two reduced or restricted bearings in the metallic portions of the socket, but does not engage the elastic plug, the friction thus being greatly reduced. The head $f'$ on the caster-shank is sufficiently large to prevent the caster being accidentally displaced from the socket, inasmuch as the walls of the hole in the plug exert considerable friction on the head in inserting the same in or withdrawing it from the elastic plug.

It will be observed that the plates C and D, shank E, and retaining-finger J of the socket are all constructed from a single piece of sheet metal stamped or struck up into the form shown in the drawings, though I do not desire to be limited to this precise construction.

It is believed that the manner of use of the device will be readily understood from the above description.

It will be understood that the elastic plug H is of a material which can be easily compressed and forced into the hole in the furniture-leg—such, for instance, as cork or rubber—and is not a wooden plug, which if it had to be forced into the hole would either split the leg or become fractured itself. Where "elastic" or "resilient" are employed in the description or claims, therefore, it will be understood to mean such material as above recited as contradistinguished from wood or the like, and where the term "such as cork" is employed in claim 1 it is not intended to limit the claim to cork only, but the invention is to cover other analogous material having the desirable elastic properties.

Having thus described my invention, what I claim, and desire to secure by Letters Patent, is—

1. A caster-socket comprising separated bearing-plates provided with bearing-openings, and a tubular plug of elastic or resilient material such as cork between and connected to said plates, substantially as described.

2. A caster comprising separated metallic plates provided with bearing-openings, an elastic or resilient plug having a hole in alinement with said bearing-openings, said plug being of greater diameter than one of said plates, means for holding the plug between said plates, a caster-shank removable from said plug, substantially as described.

3. A caster-socket comprising separated metallic plates provided with bearing-openings, one of said plates being of greater diameter than the other, a resilient or elastic plug between said plates and provided with a hole in alinement with said bearing-openings, a shank connecting said plates, and a retaining-finger for said plug opposite said shank, substantially as described.

4. In a caster, the combination of a socket comprising separated plates having bearing-openings, an elastic plug retained between said plates and having a hole in alinement with said bearing-openings, and a caster shank or pivot having a reduced body portion of a diameter less than the diameter of the hole in the plug whereby the shank is out of contact with the walls of the hole in the plug, said shank having an enlarged head, and an enlarged base-bearing portion adapted to engage in the bearing-opening of one of said plates, substantially as described.

In testimony whereof I affix my signature in the presence of two witnesses.

CHRISTIAN P. WALTER.

Witnesses:
GEORGE E. TEW,
E. M. STALEY.